(12) United States Patent
Sakamoto

(10) Patent No.: US 6,562,482 B1
(45) Date of Patent: May 13, 2003

(54) LIQUID POTTING COMPOSITION

(75) Inventor: Yushi Sakamoto, Utsunomiya (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 0 days.

(21) Appl. No.: 09/630,266

(22) Filed: Aug. 1, 2000

(30) Foreign Application Priority Data

| | | |
|---|---|---|
| Mar. 15, 1999 | (JP) | 2000-072083 |
| Aug. 2, 1999 | (JP) | 11-218424 |
| Aug. 2, 1999 | (JP) | 11-218425 |

(51) Int. Cl.$^7$ .............................. H01L 29/12
(52) U.S. Cl. ............ 428/620; 257/789; 257/793; 257/795; 523/443; 523/466
(58) Field of Search ................ 257/789, 793, 257/795; 428/620; 523/443, 466

(56) References Cited

U.S. PATENT DOCUMENTS

| | | | |
|---|---|---|---|
| 4,663,190 A | * 5/1987 | Fujita | 427/82 |
| 6,367,150 B1 | 4/2002 | Kirsten | 29/840 |

FOREIGN PATENT DOCUMENTS

| | | | |
|---|---|---|---|
| JP | 01245014 | * | 9/1989 |
| JP | 2000-141084 | | 5/2000 |

OTHER PUBLICATIONS

Abstract of WO09707541, 2/97.
Abstract of WO09707542, 2/97.
Abstract of JP 2000–141084, May 23, 2002.

* cited by examiner

*Primary Examiner*—Robert Dawson
*Assistant Examiner*—D. Aylward
(74) *Attorney, Agent, or Firm*—Anderson Kill & Olick; Eugene Lieberstein; Michael N. Meller

(57) ABSTRACT

A liquid potting composition, a semiconductor device manufactured using such composition and a process for manufacturing a semiconductor device using such composition. The liquid potting composition comprises: (a) a liquid epoxy resin; (b) a hardener comprising a multi-hydroxy aromatic compound containing at least two hydroxy groups and at least one carboxyl group; and (c) an accelerator. Suitable hardening agents include 2,3-dihydroxybenzoic acid; 2,4-dihydroxybenzoic acid; 2,5-dihydroxybenzoic acid; 3,4-dihydroxybenzoic acid; gallic acid; 1,4-dihydroxy-2-naphthoic acid; 3,5-dihydroxy-2-naphthoic acid; phenolphthaline; diphenolic acid and mixtures thereof.

17 Claims, 1 Drawing Sheet

LIQUID POTTING COMPOSITION

FIELD OF THE INVENTION

The invention relates to a liquid potting composition, a semiconductor device manufactured using such composition and a process for manufacturing a semiconductor device using such composition.

BACKGROUND OF THE INVENTION

In recent years, numerous technological advances have occurred in respect to semiconductor packaging resulting in significant reductions in the size, weight and thickness of such packaging and several processes designed to bring about such reductions are now in commercial practice. An area mounting system which bonds the projecting electrodes of a semiconductor chip to a circuit board using solder has become quite important and has generally replaced existing lead frame connection technology.

One of the methods used to minimize semiconductor packaging size is a flip chip which contains projecting electrodes on the circuit side of a semiconductor. In the case of solder electrodes, flip chip packaging causes the connection of the electrodes to the circuit board by re-flow processes after a reflux process has been carried out in order to remove any oxide film from the electrode surfaces and the surface of the circuit board. As a result, flux residues remain on the electrode surfaces. Since the presence of such flux represents an impurity which could adversely affect the performance of the circuit board, it must be removed by cleaning the electrode surfaces and the surface of the circuit board by flux removal prior to application of any liquid potting composition. Such cleaning process is necessary since the circuit board connects directly to the projecting electrodes and reliability tests such as temperature cycle tests indicate electrical failures at the points of connection of the electrodes to the circuit board due to the differences in linear coefficients of expansion between the chip and the circuit board.

Typical potting techniques involve the coating of a liquid resin on the rim of a chip or on multiple surfaces and thereafter running the liquid resin between the circuit board and the chip by means of capillarity action. However, such method entails very high processing time due to the flux process and the cleaning process, as well as environmental problems resulting from the need to dispose of the spent cleaning liquid. Furthermore, the excessive time required for the potting process with the liquid resin using capillarity action significantly affects the production rate for the potted semiconductor.

U.S. Pat. No. 5,128,746 discloses a process wherein a resin is coated directly onto the surface of a circuit board, a chip having solder electrodes is placed on top of the coated circuit board, and the assembly is thereafter heated to simultaneously carry out resin potting and solder bonding. The unique feature disclosed in this patent is the addition of a component which imparts a flux function to the resin composition (which comprises a thermosetting resin and a hardener) to connect the solder to the circuit board However, the component which imparts the flux function to the resin composition is a carboxylic acid having a high degree of acidity. Such acid generates ionic impurities and the electrical conductivity of the hardened potting resin increases. In particular, the electrical insulation properties of the hardened resin composition are degraded due to hygroscopic effects created by the addition of such component to the resin composition.

It has been found that when a main component having the flux function is a monocarboxylic acid such as rosin and abietic acid, the component having the flux function is capable of reacting with the epoxy groups of the resin component because the acidity of the monocarboxylic acid with the flux function is high. However, the component having the flux function initiates hydrolysis and separates the acid in the hardened potting resin after exposure to high humidity conditions. As a result, the electrical conductivity of the hardened potting resin is degraded.

On the other hand, the hardeners employed in the liquid potting composition of the invention are incorporated in the cross-linking reaction during the hardening process and further, ether bonding prevents hydrolysis due to the absorption of moisture. Accordingly, the problems noted above with respect to prior art hardeners do not occur with the hardeners employed in the liquid potting compositions of the present invention since the carboxyl group is partially reacted with the epoxy group thereby preventing separation of the epoxy groups from the resin even if moisture absorption occurs. In order to control the degree of cross-linking, the liquid epoxy resin may be reacted in advance with the multi-hydroxy aromatic compound containing at least two hydroxyl groups and at least one carboxyl group described below and the reaction product thereof may be used as a hardener.

OBJECTS OF THE INVENTION

It is an object of the invention to prepare a liquid potting composition for use in an area mounting system for potting semiconductor chips, especially chips containing projecting electrodes on the circuit side, which will provide superior electrical insulation properties, short potting times and low levels of ionic impurities.

It is a further object of the invention to provide a process for manufacturing a semiconductor device wherein an area mounting system is used to connect a semiconductor chip containing projecting electrodes on a circuit side to a circuit board.

Such objects as well as further objects will be apparent from the description of the invention which follows hereinbelow.

SUMMARY OF THE INVENTION

Figure 1:
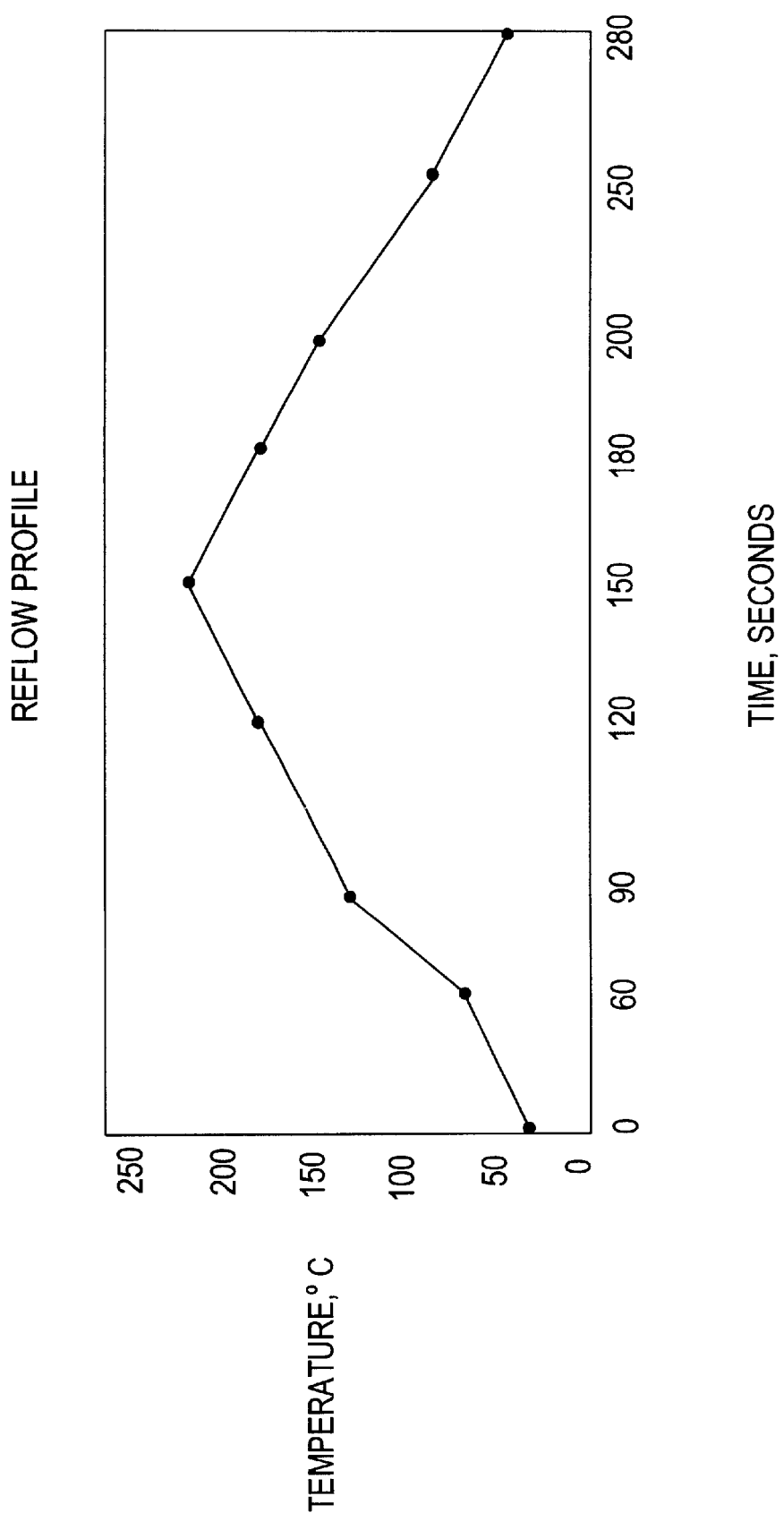
FIG. 1 is a graph which illustrates the temperature flow profile in the reflow process for the liquid potting composition of the invention.

The invention is directed to liquid potting compositions comprising an epoxy resin, a hardener with flux function and an accelerator, as well as to semiconductor devices prepared from such compositions and processes for manufacturing such devices using such compositions.

DETAILED DESCRIPTION OF THE INVENTION

The liquid potting composition comprises:
(a) a liquid epoxy resin;
(b) a hardener comprising a multi-hydroxy aromatic compound containing at least two hydroxyl groups and at least one carboxyl group; and
(c) an accelerator.

The liquid epoxy resin component may be any of the various types of epoxy resins that have an average epoxy equivalent of more than two and have been used for potting of semiconductor chips and circuit boards. For example, the liquid epoxy resin may be a bisphenol type-diglycidyl ether containing saturated aromatic rings which may be obtained by a hydrogenation reaction. The epoxy resin is a liquid at room temperature; a suitable example of such a resin is that which may be obtained by reacting phenol novolak and epichlorohydrin. Other epoxy resins which are liquid at room temperature may also be used such as the foregoing epoxy resin in admixture with one or more of the crystal epoxy resin of the diglycidyl ether of dihydroxynaphthalene, the diglycidyl ether of tetramethyl bisphenol and the like.

The hardener will typically be present in the amount of about 5 to about 60 wt. %, based on the weight of the liquid potting composition. Lower amounts of hardeners decrease the degree of cross-linking of the epoxy resin, thereby resulting in possible decreases in the strength of adhesion of the potting composition to the semiconductor chip and the circuit board. Higher amounts of the hardener are undesirable since separation of the carboxyl group may occur in the hardened resin. The hardener of a single type or a mixture of hardeners may be incorporated in the liquid potting composition.

Suitable hardeners include 2,3-dihydroxybenzoic acid; 2,4-dihydroxybenzoic acid; 2,5-dihydroxybenzoic acid; 3,4-dihydroxybenzoic acid; gallic acid; 1,4-dihydroxy-2-naphthoic acid; 3,5-dihydroxy-2-naphthoic acid; phenolphthaline; diphenolic acid (also known as 4,4-bis(4-hydroxyphenyl)valeric acid) and mixtures thereof.

The liquid potting composition optionally includes one or more additional hardeners such as phenol novolak resins; orthocresol novolak resins; phenolic compounds containing at least two functional moieties, imidazoles, diazo compounds hydrazine and well as amino compounds such as dicyandiamide. Such additional hardeners, if used, will be present in an amount of not greater than about 50 wt. %, based on the weight of the total amount of all hardeners. Greater amounts are undesirable since they would have a tendency to decrease the flux function.

The accelerator employed in the liquid potting composition may be any of those typically used as accelerators for hardening of liquid epoxy resins. Examples of suitable accelerators include imidazoles, phosphorous compounds, diazo compounds and tertiary amines. Typically, the accelerator will be present in the amount of about 0.1 to about 5.0 wt. %, based on the weight of the liquid potting composition.

The viscosity of the liquid potting composition of the invention will be less than about 100 Pa·s., preferably less than 70 Pa·s., as measured at 25° C. A composition having a viscosity over 100 Pa.s. is not favored for use with an area packaging system since such a high viscosity would lead to the development of voids, chips insufficiently dampened with the composition and composition remaining between the projecting electrodes and the circuit board, resulting in deficient electrical connections.

The liquid potting composition of the invention preferably includes an electrically non-conducting filler, present in an amount of less than about 80 wt. %, preferably less than 50 wt. %, based on the weight of the composition. Although there is no limit to the amount of filler which may be incorporated in the liquid potting composition of the invention, the preferable maximum amount is about 80 wt. % in order to retain desirable characteristics such as resistance to humidity, flexibility, etc. Furthermore, filler amounts in excess of about 80 wt. % may cause the filler (which has insulation properties) to adversely affect the electrical connection between the electrodes on a circuit board and the projecting electrodes of a semiconductor. Suitable fillers include calcium carbonate, silica, alumina and aluminum nitride. The preferred filler is silica due to its cost and reliability.

Preferably, the filler is comprised of particles having a generally spherical shape and an average particle size of less than about 10 µm and a maximum particle size of less than about 50 µm.

The liquid potting composition of the invention may also include the usual additional ingredients such as reactive diluents, pigments, dyes, leveling agents, defoaming agents, coupling agents, etc. These ingredients may be readily mixed in the composition and vacuum deaeration is employed to remove undesirable gas bubbles.

Semiconductor components such as flip chips and CSP (chip size package) may be readily potted using the liquid potting composition of the invention. The liquid potting composition of the invention does not add any additional flux agents and it is possible to coat the composition directly onto the circuit board (or circuit side of the chip), mount the chip onto the coated circuit board (or mount the coated chip on the circuit board), and heat the assembly to perform solder connection and harden the potting resin simultaneously by heating. Prior art production procedures and systems for the manufacture of semiconductor components and semiconductor devices may be used in conjunction with the liquid potting composition of the invention.

Typically, the process of the invention for manufacturing a semiconductor device wherein an area packaging system is used to connect a semiconductor chip containing projecting electrodes on a circuit side to a circuit board comprises the steps of:

(1) coating the semiconductor chip of the circuit side containing the projecting electrodes and/or coating the circuit board with the liquid potting composition described above;

(2) positioning the chip in relation to the circuit board such that the electrodes are aligned with the desired sites on the circuit board; and (3) heating the positioned chip and circuit board resulting from step (2) so as to electrically connect the electrodes to the circuit board and harden the potting composition.

The following nonlimiting examples shall serve to illustrate the invention. Unless otherwise indicated, all parts and percentages are on a weight basis.

EXAMPLE 1

One hundred weight units of bisphenol type F epoxy resin with an epoxy equivalent of 165 and a viscosity of 3 Pa·s. at 25° C. was used as the liquid epoxy resin, 30 weight units of 2,5-dihydroxybenzoic acid was used as the hardener and 1 weight unit of 1,8-diazabicyclo[5.4.0]-7-undecene was used as the accelerator together with 2 weight units of γ-glycidoxypropyltrimethoxysilane as a coupling agent. The foregoing ingredients were kneaded and vacuum deaeration was applied to the kneaded mixture to remove undesirable gas bubbles. The viscosity of the resultant liquid potting composition was 10 Pa·s. at 25° C. The properties of the composition were evaluated and the results of such evaluation are set forth in Table I below.

EXAMPLE 2

Eighty weight units of a spherical silica having a maximum particle size of 10 µm and an average particle size of 1 µm were added to the potting composition described in Example 1. The viscosity of the resultant potting composition was 65 Pa·s. at 25° C. The properties of this composition were evaluated and the results of such evaluation are set forth in Table I below.

EXAMPLE 3

Example 1 was repeated except that 1,4-dihydroxy-2-naphthoic acid was substituted for the 2,5-dihydroxybenzoic acid. The viscosity of the resultant potting composition was 45 Pa·s. at 25° C. The properties of this composition were evaluated and the results of such evaluation are set forth in Table I below.

EXAMPLE 4

Example 1 was repeated except that phenolphthaline was substituted for the 2,5-dihydroxybenzoic acid. The viscosity of the resultant potting composition was 15 Pa·s. at 25° C. The properties of this composition were evaluated and the results of such evaluation are set forth in Table I below.

EXAMPLE 5

One hundred weight units of bisphenol type F epoxy resin with epoxy equivalent of 160 and a viscosity of 2 Pa·s. at 25° C. was used as the liquid epoxy resin, 40 weight units of 1,4-dihydroxy-2-naphthoic acid was used as the hardener, 1 weight unit of 1,8-diazabicyclo[5.4.0]-7-undecene was used as the accelerator together with 2 weight units of γ-glycidoxypropyltrimethoxysilane as a coupling agent. The foregoing ingredients were kneaded and vacuum deaeration was applied to the kneaded mixture to remove undesirable gas bubbles. The viscosity of the resultant liquid potting composition was 10 Pa·s. at 25° C. The properties of the composition were evaluated and the results of such evaluation are set forth in Table I below.

Comparative Example 1

One hundred weight units of bisphenol type F epoxy resin with epoxy equivalent of 165 and a viscosity of 3 Pa·s. at 25° C. was used as the liquid epoxy resin, 85 weight units of methylhexahydrophthalic acid anhydride was used as the hardener, 1 weight unit of 2-phenyl4-methylimidazole was used as the accelerator, together with 2 weight units of γ-glycidoxypropyltrimethoxysilane as a coupling agent and 12 weight units of malic acid to provide flux properties. The foregoing ingredients were kneaded and vacuum deaeration was applied to the kneaded mixture to remove undesirable gas bubbles. The viscosity of the resultant liquid potting composition was 1.4 Pa·s. at 25° C. The properties of the composition were evaluated and the results of such evaluation are set forth in Table I below.

Comparative Example 2

Example 1 was repeated, except that 12 weight units of adipic acid were added to the composition. The ingredients were kneaded and vacuum deaeration was applied to the kneaded mixture to remove undesirable gas bubbles. The viscosity of the resultant liquid potting composition was 1.2 Pa·s. at 25° C. The properties of the composition were evaluated and the results of such evaluation are set forth in Table I below.

Comparative Example 3

One hundred weight units of bisphenol type F epoxy resin with epoxy equivalent of 165 and a viscosity of 3 Pa·s. at 25° C. was used as the liquid epoxy resin, 63 weight units of phenol novolak resin (hydroxide equivalent of 105) was used as the hardener, 1 weight unit of 2-phenyl-4-methylimidazole was used as the accelerator, together with 2 weight units of γ-glycidoxypropyltrimethoxysilane as a coupling agent. The ingredients were kneaded and vacuum deaeration was applied to the kneaded mixture to remove undesirable gas bubbles. The viscosity of the resultant liquid potting composition was 55 Pa·s. at 25° C. The properties of the composition were evaluated and the results of such evaluation are set forth in Table I below.

Comparative Example 4

Example 1 was repeated, except that bisphenol type A epoxy resin with epoxy equivalent of 190 was used as the liquid epoxy resin. The viscosity of the resultant potting composition was 120 Pa·s. at 25° C. The properties of the composition were evaluated and the results of such evaluation are set forth in Table I below.

The following properties of the potting compositions were evaluated and reported in Table I set forth below:

(1) Volumetric Resistivity: After the potting composition was cured, the volumetric resistivity was measured using Japanese Industrial Standard Test No. JIS K-6911. Additional measurements were made after the specimens were conditioned for 96 hours at 85° C. and 85% relative humidity. The property of volumetric resistivity is measured at room temperature.

(2) Electrical Conductivity: A vibration mill was used to powder the specimen which had been subjected to curing at 150° C. for 3 hours. 1.5 grams of the powder and 30 grams of distilled water were processed in an extractor at 125° C. for 20 hours and the electrical conductivity of the resultant material was measured using an electrical conductance meter.

(3) Removability: The removability of the oxidized surface layer was determined as follows: The potting composition was coated on top of a copper plate and the composition was then cured. Thereafter, the cured potting composition was physically removed and the surface condition of the copper plate was observed.

(4) Bondability: The potting composition was coated on a copper clad laminate. Thereafter a facsimile of a semiconductor device of about 10×10 mm equipped with solder electrodes of 150 micrometers diameter and having a melting point of 183° C. was positioned (or set) on the coated copper clad laminate. Thereafter, the facsimile on the coated copper clad laminate was subjected to reflow processing at the temperature and time conditions shown in FIG. 1. After reflow processing, the facsimile was heated at 150° C. for three hours to cure the resin. A vertical section of the cured material was inspected and the condition of the solder electrodes are evaluated.

(5) Reflow Process: The sample is subjected to heating over a temperature span of 25 to 250° C. in 50° C. increments over a period of time ranging from 0 to 280 seconds in 30 second increments and the degree of flow of the sample is measured at each temperature-time increment so as to arrive at the reflow profile shown in FIG. 1.

TABLE 1

| Property | Units | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
| --- | --- | --- | --- | --- | --- | --- | --- | --- | --- | --- |
| Volumetric Resistivity* | Ω-cm | $8 \times 10^{-15}$ | $6 \times 10^{-15}$ | $7 \times 10^{-15}$ | $8 \times 10^{-15}$ | $3 \times 10^{-15}$ | $9 \times 10^{-15}$ | $6 \times 10^{-15}$ | $7 \times 10^{-15}$ | $3 \times 10^{-15}$ |
| Volumetric Resistivity** | Ω-cm | $4 \times 10^{-13}$ | $2 \times 10^{-14}$ | $6 \times 10^{-14}$ | $1 \times 10^{-13}$ | $3 \times 10^{-15}$ | $5 \times 10^{-10}$ | $4 \times 10^{-10}$ | $3 \times 10^{-13}$ | $4 \times 10^{-14}$ |
| Electrical Conductivity | μS/cm | 50 | 44 | 43 | 46 | 52 | 239 | 266 | 38 | 87 |
| Removability*** | | glitter | glitter | glitter | glitter | glitter | glitter | glitter | non-glitter | glitter |
| Bondability | | pass | pass | pass | pass | pass | pass | pass | fail | fail |

*Volumetric resistivity after curing.
**Volumetric resistivity after conditioning at 85° C. and 85% R.H. for 96 hours.
***Glitter means that the oxidized surface layer was completely removed from the copper plate.

What is claimed is:

1. A liquid potting composition comprising:
   (1) a liquid epoxy resin;
   (2) a hardener comprising a multi-hydroxy aromatic compound containing at least two hydroxyl groups and at least one carboxyl group; and
   (3) an accelerator,
   wherein the viscosity of the composition, as measured at 25° C. is less than 100 Pa·s.

2. The composition of claim 1 wherein the hardener is selected from the group consisting of 2,3-dihydroxybenzoic acid; 2,4-dihydroxybenzoic acid; 2,5-dihydroxybenzoic acid; 3,4-dihydroxybenzoic acid; gallic acid; 1,4-dihydroxy-2-naphthoic acid; 3,5-dihydroxy-2-naphthoic acid; phenolphthaline; diphenolic acid and mixtures thereof.

3. The composition of claim 1 wherein the hardener is present in the amount of about 5 to about 60 wt %, based on the weight of the epoxy resin.

4. The composition of claim 1 further comprising one or more additional hardeners selected from the group consisting of phenol novolak resins; orthocresol novolak resins; phenolic compounds containing at least two functional moieties, imidazoles, diazo compounds hydrazine and amino compounds.

5. The composition of claim 4 wherein the additional hardeners are present in an amount of not greater than about 50 wt. %, based on the total weight of all hardeners.

6. The composition of claim 1 wherein the accelerator comprises a compound selected from the group consisting of imidazole compounds, phosphorous compounds, diazo compounds and tertiary amines.

7. A liquid potting composition comprising:
   (1) a liquid epoxy resin;
   (2) a hardener comprising a multi-hydroxy aromatic compound containing at least two hydroxyl groups and at least one carboxyl group; and
   (3) an accelerator,
   wherein the viscosity of the composition, as measured at 25° C., is less than 70 Pa·s.

8. The composition of claim 1 further including an electrically non-conducting filler.

9. The composition of claim 8 wherein the filler is present in an amount of less than about 80 wt. %, based on the weight of the composition.

10. The composition of claim 9 wherein the filler is present in an amount of less than 50 wt. %, based on the weight of the composition.

11. The composition of claim 8 wherein the filler is selected from the group consisting of calcium carbonate, silica, alumina and aluminum nitride.

12. The composition of claim 8 wherein the filler is comprised of particles having a spherical shape.

13. The composition of claim 8 wherein the filler comprises particles having an average particle size of less than about 10 μm and a maximum particle size of less than about 50 μm.

14. The composition of claim 1 further comprising one or more ingredients selected from the group consisting of reactive diluents, pigments, dyes, leveling agents deaerifying agents, anti-foaming agents, leveling agents and coupling agents.

15. A semiconductor device which has been manufactured using the composition of claim 1.

16. A process for manufacturing a semiconductor device wherein an area packaging system is used to electrically connect a semiconductor chip containing projecting electrodes on a circuit side to a circuit board comprising the steps of:
   (1) coating the semiconductor chip of the circuit side containing the projecting electrodes and/or the circuit board with the potting composition of claim 1;
   (2) positioning the chip in relation to the circuit board such that the electrodes are aligned with the desired sites on the circuit board; and
   (3) heating the positioned chip and circuit board resulting from step (2) so as to electrically connect the electrodes to the circuit board and harden the potting composition.

17. A semiconductor device manufactured in accordance with the process of claim 16.

* * * * *